Figure 1:
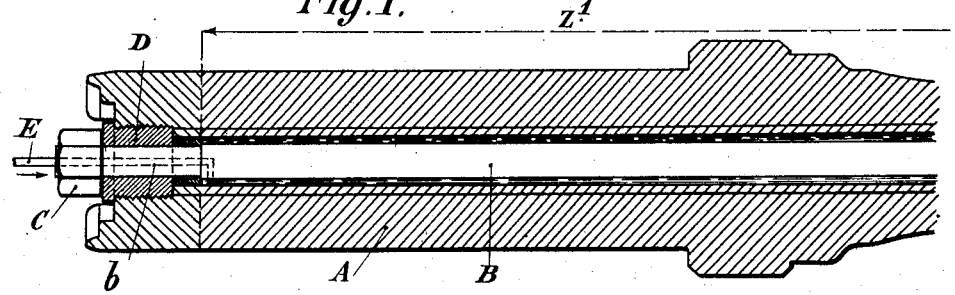

E. SCHNEIDER.
PROCESS AND APPARATUS FOR THE MANUFACTURE OF METAL TUBES BY THE SELF HOOPING PROCESS.
APPLICATION FILED MAR. 31, 1919.

1,391,009.

Patented Sept. 20, 1921.

3 SHEETS—SHEET 1.

Inventor:
Eugène Schneider
by
Mauro, Cameron, Lewis & Massie
Attys

E. SCHNEIDER.
PROCESS AND APPARATUS FOR THE MANUFACTURE OF METAL TUBES BY THE SELF HOOPING PROCESS.
APPLICATION FILED MAR. 31, 1919.
1,391,009.
Patented Sept. 20, 1921.
3 SHEETS—SHEET 2.
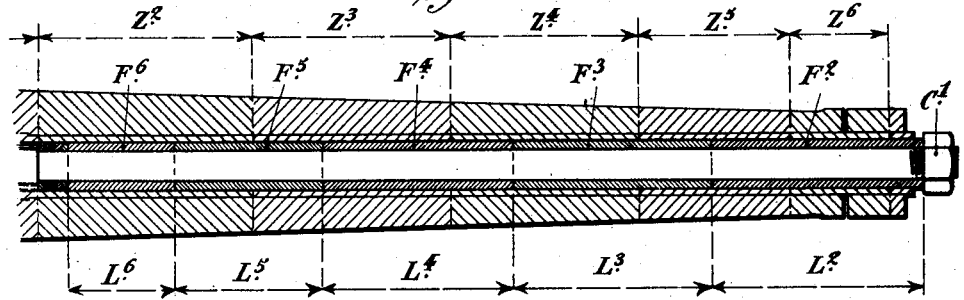
Fig. 1.ᵃ
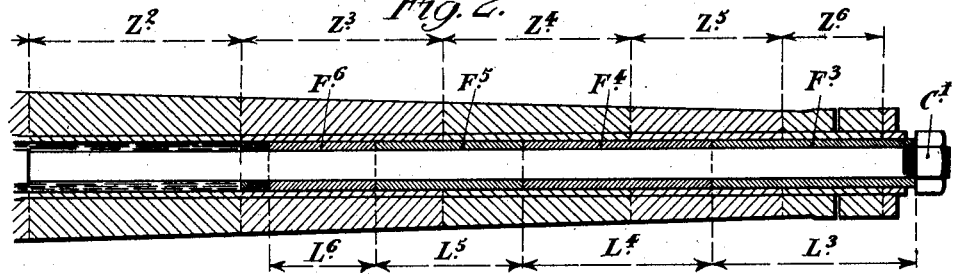
Fig. 2.ᵃ
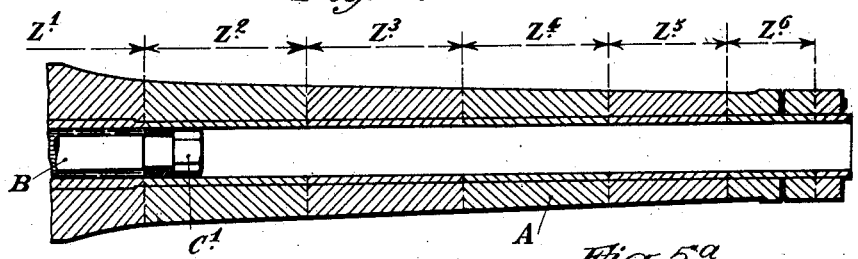
Fig. 4.ᵃ
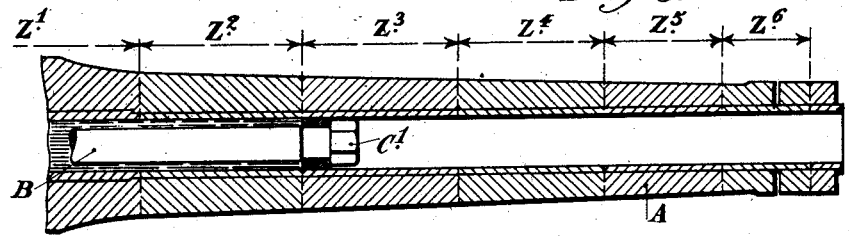
Fig. 5.ᵃ

E. SCHNEIDER.
PROCESS AND APPARATUS FOR THE MANUFACTURE OF METAL TUBES BY THE SELF HOOPING PROCESS.
APPLICATION FILED MAR. 31, 1919.

1,391,009.

Patented Sept. 20, 1921.
3 SHEETS—SHEET 3.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

PROCESS AND APPARATUS FOR THE MANUFACTURE OF METAL TUBES BY THE SELF-HOOPING PROCESS.

1,391,009.  Specification of Letters Patent.  Patented Sept. 20, 1921.

Application filed March 31, 1919. Serial No. 286,501.

*To all whom it may concern:*

Be it known that I, EUGÈNE SCHNEIDER, citizen of the French Republic, and resident of 42 Rue d'Anjou, Paris, France, have invented a new and useful Improved Process and Apparatus for the Manufacture of Metal Tubes by the Self-Hooping Process, which invention is fully set forth in the following specification.

This invention has for its object to provide an improved process and apparatus for the manufacture of metal tubes of great strength by the "self-hooping" process.

This invention is applicable to the known process wherein the "self-hooping" is effected by the pressure of a liquid acting between the inner wall of the tube to be shaped, and a resistant core ("self-hooping" mandrel) inserted in the said tube.

In order to allow of applying pressures varying according to the various zones of the tube owing to the thickness of the latter that vary at the different points of its length, it is necessary to shift one of the heads (between the mandrel and the inner wall of the tube) that limit the extent of the zone that is to be treated at any one time.

With the hitherto known means each shifting of the head entails a rather lengthy operation, practically requiring the dismounting and replacing of the mandrel, which operation is not always done without impairing the connections.

According to the present invention the shifting of the head is effected automatically without any previous withdrawal, by the action of the liquid under pressure; the operation comprising only a rapid and very simple operation and not entailing any dismounting of the mandrel whatever.

For this purpose there is slipped on the mandrel a series of juxtaposed liners or sleeves shaped to fit the annular space between the said mandrel and the tube, the sections being each of a length corresponding approximately to the respective lengths of the successive zones to be treated. By withdrawing these liners or liner sections, that is to say, by reducing their number in succession by one unit, there is uncovered each time an increased length of the inner wall of the tube and of the outer surface of the mandrel, and the liquid is allowed to exert a thrust upon the head which latter is thereby caused automatically to take its place at the end of that section of the tube that has just been uncovered.

The liners may be arranged on the mandrel inside the tube to be shaped, in which case the head, in shifting, will slide along on a mandrel that is kept in a fixed position in the tube.

The liners may be arranged on a part of the mandrel that projects out of the tube at the commencement of the operation. In such a case the sliding of the head which is then situated near the inner end of the mandrel, will be produced by an automatic shifting of this end of the mandrel caused by the withdrawal of a liner.

These two constructional forms of the improved apparatus are illustrated by way of example in the accompanying drawings in which:—

Complementary Figures 1, 1ª are a longitudinal section of a gun barrel tube in course of manufacture by the "self-hooping" process. The mandrel, the sliding head and the removable liners are shown in the positions they occupy at the commencement of the operation.

Figure 2:
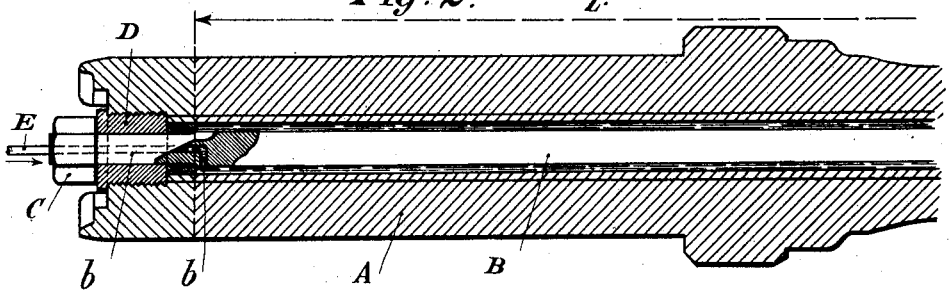
Figure 3:
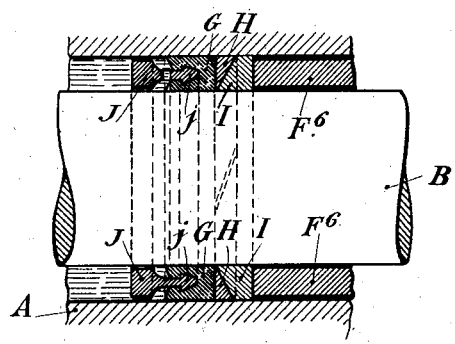

Complementary Figs. 2, 2ª are a similar section in which the parts are shown in the positions they occupy after the sliding of the joint and the ejection of a liner; and Fig. 3 is a longitudinal section of the details of the sliding joint.

Figure 4:
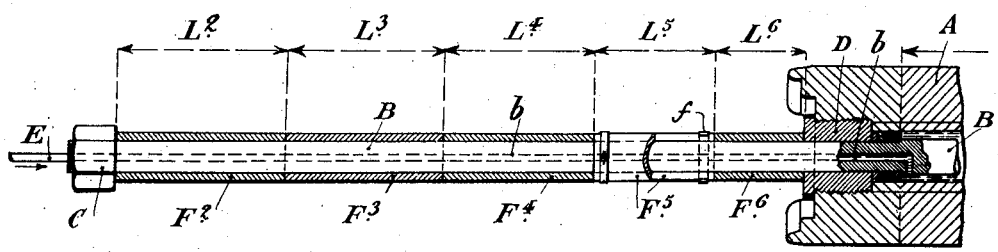

Figs. 4, 4ª and 5, 5ª are similar longitudinal sections illustrating two different stages of the operation of one and the same second constructional form of the improved apparatus applied to the "self-hooping" of a gun barrel tube.

In these various figures, A is the tube to be "self-hooped"; and B is the "self-hooping" mandrel.

In the example shown in Figs. 1, 1ª and 2, 2ª, the mandrel B is fixed in the tube A. Its rear end is pierced with a passage $b$ for the admission of the charges of liquid under pressure, and receives a nut C by means of which the mandrel bears against a screw plug D screwed in the rear end of the tube A. The passage $b$ communicates with the liquid supply pipe E.

A length of mandrel corresponding to the length of a first rearward zone $Z^1$ of the tube A, is left uncovered at the said zone. The whole of the remaining length of the mandrel is surrounded by a liner composed of a plurality of juxtaposed sleeves or sections, $F^2$, $F^3$, $F^4$, $F^5$ which vary according to the number of zones of treatment $Z^2$, $Z^3$, $Z^6$ and are made of lengths to correspond. The front liner $F^2$, that is, the first liner to be ejected, has a length suitable to the length of the zone $Z^2$; the second liner $F^3$ has a length $L^3$ equal to the length of the following zone $Z^3$, and so on. $C^1$ is a retaining nut screwed on the front end of the mandrel.

That portion of the mandrel B that has been left uncovered at the commencement of the operation, is limited at the rear by a fixed annular joint, and in front by the annular head. These two heads, and especially the sliding head, are preferably constructed as shown in Fig. 3.

They comprise in the known way, a cup ring G made of a plastic material, (special hard rubber or other substance), bearing by means of a beveled split metal ring H against an abutment ring I having a corresponding bevel; this ring I may be split or not. According to the present invention the driving ring J engages in the cup ring G by means of a harpoon-shaped portion $j$, that is to say, having shoulders which enable it to have a firm grip on the plastic material and thus insure that the said ring shall share the shifting movements of the joint. This joint has a continual bearing against the retaining nut $C^1$ by means of the liner sections, $F^2$, $F^3$, $F^6$. When this nut is removed, the front head together with the liner sections will be forced out as a whole by the pressure of the liquid.

After the zone $Z^1$ of the tube A has been subjected for the first time during the desired period to the action of a charge of the pressure liquid, it will be merely necessary to remove the retaining nut $C^1$ in order to allow the sliding head to move forward. This forward movement can take place under a very low pressure, and this pressure can be regulated by simply operating the valve that admits the liquid into the interior of the mandrel B. The movement can then be stopped immediately the first liner section $F^2$ is ejected: this position is shown in Fig. 2ᵃ. The retaining nut $C^1$ is then replaced, and the apparatus is ready for treating the two zones $Z^1$ and $Z^2$ together as a whole.

After this treatment, the head is shifted again automatically in the same way, and then the zones $Z^1$, $Z^2$, $Z^3$ are treated together as a whole and so on.

It will be perceived that the zones $Z^1+Z^2$, taken together as a whole cover the zone $Z^1$ without the least interruption. Similarly the zones $Z^1+Z^2+Z^3$ taken together as a whole, cover without any interruption the entity consisting of the zones $Z^1+Z^2$.

In the modification illustrated in Figs. 4, 4ᵃ and 5, 5ᵃ the liner sections $F^2$, $F^3$, $F^6$ are slipped over a portion of the "self-hooping" mandrel B that is allowed to project out of the tube A at the rear end of the latter, between a retaining nut C and an annular plug D. The portion of the mandrel that is allowed to remain inside the tube at the commencement of the operation, has a length equal to the length of the zone $Z^1$ which is to be treated next immediately. The sliding head bears against the nut $C^1$ screwed on the inner end of the mandrel.

The liquid under pressure enters through the axial passage $b$, into the annular space between the mandrel B and the inner wall of the tube A, which space is limited at the rear by the fixed rear annular head, and at the front by the sliding annular head that bears against the nut $C^1$.

When the zone $Z^1$ of the tube has been subjected for a first time during the desired period to the pressure of the liquid, the liner section $F^2$ is removed. This removal may be effected without first unscrewing the nut C and without undoing the connection with the flexible pipe E supplying the liquid. For this purpose it is sufficient to make the liner sections in two-half sections provided with assembling flanges or collars $f$ as indicated in the drawings in the case of the liner section $F^5$; said flanges being bolted or otherwise connected together.

Figure 5:
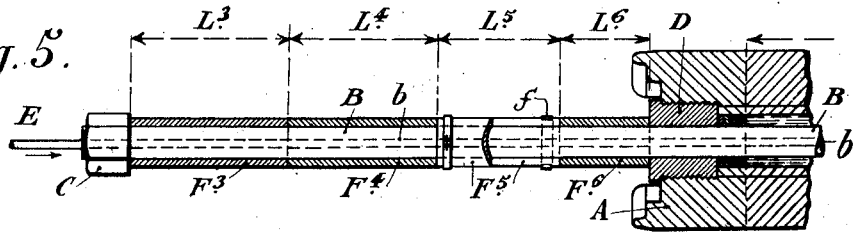

By the action of the liquid pressure upon the sliding annular head, the mandrel B will then move into the tube, and will assume the position shown in Fig. 5, 5ᵃ, the nut C then abutting through the medium of the whole of the remaining liner sections against the annular plug D.

The operation will be continued in this way until all the liner sections have been removed, and the nut C is abutting directly against the annular plug D for the purpose of performing a last treatment of the tube throughout the entire length of the latter including the extreme front zone $Z^6$.

It is to be understood that by dividing up the liner in a suitable manner and into a sufficient number of sections, and ejecting or removing these sections one by one, the tube may be subdivided into any desired number of consecutive zones so as to adapt the deformations as exactly as possible to the outer profile of the tube, and to the strains to which the various zones of the tube will be subjected when the gun is fired; and that, to repeat what has already been said above, the whole operation is performed without entailing any removal or replacing of the mandrel, or the removal and replacement of any head; the entire apparatus comprising only one fixed head and one head which is adapted to be shifted automatically by the liquid pressure.

What I claim is:—

1. The process of treating metallic tubes to shape and to strengthen the wall thereof, consisting in subjecting the interior of the tube to successive charges of reforming fluid-pressure initially introduced in one end of the tube and progressively increasing the areas of application of the successive charges toward the other end of the tube, the fluid of each preceding charge being retained in the tube and the fluid of the succeeding charge added thereto.

2. The process of treating metallic tubes to shape and to strengthen the wall thereof, consisting in subjecting the interior of the tube to successive charges of deforming fluid-pressure initially introduced in one end of the tube and progressively increasing the areas of application of the successive charges toward the other end of the tube, the fluid of each preceding charge being retained in the tube and the fluid of the succeeding charge added thereto, and confining each charge to a predetermined zone of application with each succeeding zone of application overlapping the preceding zone of application.

3. The process of treating metallic tubes having a wall comparatively thick at one end and tapering toward the other end to shape and to strengthen said wall, consisting in subjecting the interior of the tube to successive charges of deforming fluid-pressure initially introduced in the end of the tube having the thicker wall and progressively increasing the areas of application toward the other end of the tube, the fluid of each preceding charge being retained in the tube and the fluid of the succeeding charge added thereto, and confining each charge to a predetermined zone of application with each succeeding zone of application including all of the preceding zones of application.

4. The process of treating gun-barrels having a wall comparatively and uniformly thick in the breech and tapering in the chase toward the muzzle to shape and to strengthen said wall, consisting in subjecting the interior of the barrel to successive charges of deforming fluid-pressure initially introduced in the breech-end of the barrel and progressively increasing the areas of application toward the muzzle-end of the barrel, the fluid of each preceding charge being retained in the barrel and the fluid of the succeeding charge added thereto, and confining each charge to a predetermined zone of application, the zone of the initial application being approximately coextensive with the breech of the barrel and the zones of the succeeding applications being progressively extended toward the muzzle of the barrel and with each succeeding zone of application, including the preceding zone of application.

5. The process of treating metallic tubes to shape and to strengthen the same by fluid-pressure introduced between a closed end of the tube and a head adjustable along the bore of the tube, consisting in subjecting the interior of the tube between the closed end thereof and the head to deforming fluid-pressure and then introducing additional fluid-pressure to move the head to its next adjustment to extend the area of application, applying deforming fluid-pressure to the area so extended, and repeating the operation throughout the length of the tube.

6. The process of treating metallic tubes to shape and to strengthen the same by fluid-pressure introduced between a closed end of the tube and a head slidably adjustable on a mandrel mounted in the tube, consisting in subjecting the interior of the tube between the closed end thereof and the head temporarily held on the mandrel to deforming fluid-pressure and then introducing additional fluid-pressure to move the released head to its next adjustment to extend the area of application, applying deforming fluid-pressure to the area so extended with the head held on the mandrel to confine the application to such area, and repeating the operation throughout the length of the tube without dismounting the mandrel and head from the tube.

7. An apparatus for treating metallic tubes to shape and to strengthen the same, comprising means for closing one end of the tube, means for introducing successive charges of deforming fluid-pressure into the closed end of the tube, a head movable along the interior of the tube by the thrust of the fluid-pressure therein to progressively increase the area of fluid-pressure application, and adjusting means mounted in the tube and operative to limit the advance of the head to predetermined intervals and to hold said head in its adjusted positions against the thrust of the deforming fluid-pressure.

8. An apparatus for treating metallic tubes to shape and to strengthen the same, comprising means for closing one end of the tube, means for introducing successive charges of deforming fluid-pressure into the closed end of the tube, a mandrel mounted in the tube to remain therein during the treatment of the tube, a head slidable on the mandrel to be moved along the interior of the tube by the thrust of the fluid-pressure, and holding means carried by the mandrel to limit the advance of the head to predetermined intervals and to hold said head in its adjusted positions against the thrust of the deforming fluid-pressure.

9. An apparatus for treating metallic tubes to shape and to strengthen the same, comprising means for closing one end of the tube, means for introducing successive charges of deforming fluid-pressure into the closed end of the tube, a head movable along the interior of the tube by the thrust of the fluid-pressure therein to progressively increase the area of fluid-pressure application, a series of abutting elements mounted in the tube in advance of the head to be sequentially displaced from the tube by the forward movement of the head, and adjusting means for engaging the outermost element to hold the remaining elements and the head against further displacement by the fluid-pressure, the length of the displaced elements determining the advance of the head.

10. An apparatus for treating metallic tubes to shape and to strengthen the same, comprising means for closing one end of the tube, means for introducing successive charges of deforming fluid-pressure into the closed end of the tube, a mandrel mounted in the tube to remain therein during the treatment of the tube, a head slidable on the mandrel to be moved along the interior of the tube by the thrust of the fluid-pressure, a series of abutting elements carried by the mandrel in advance of the head to be sequentially displaced from the mandrel by the forward movement of the head, and holding means operative to connect the outermost element to the mandrel to hold the remaining elements and the head against further displacement by the fluid-pressure, the length of the displaced elements determining the advance of the head.

11. An apparatus for treating metallic tubes to shape and to strengthen the same, comprising means for closing one end of the tube, means for introducing successive charges of deforming fluid-pressure into the closed end of the tube, a head movable along the interior of the tube by the thrust of the fluid-pressure therein, a series of separate abutting elements carried by a support in advance of the head to be sequentially displaced from the tube by the forward movement of the head, and holding means operative to engage the outermost of the abutting elements to hold the remaining elements and the head against further displacement by the fluid-pressure, the length of the displaced elements determining the advance of the head.

12. An apparatus for treating metallic tubes to shape and to strengthen the same, comprising means for closing one end of the tube, means for charging fluid-pressure into the closed end of the tube, a head movable in the tube in advance of the fluid-pressure to confine the latter to a predetermined zone of application, a mandrel carrying a series of sleeves sequentially displaceable therefrom coöperating with a holding means to hold the head against the thrust of a fluid-pressure application, the sequential displacement of the sleeves from the mandrel controlling the advance of the head, the length of the individual sleeves determining the area of increase in the consecutive applications of the fluid-pressure.

13. An apparatus for treating metallic tubes to shape and to strengthen the same, comprising means for closing one end of the tube, means for charging fluid-pressure into the closed end of the tube, a head movable in the tube in advance of the fluid-pressure to confine the latter to a predetermined zone of application, a series of elements placed in the tube in advance of the head to control the movement of said head, said elements being movable in the tube to be sequentially ejected from the open end thereof, the length of an ejected element determining the advance of the head for the subsequent application of fluid-pressure, and means for holding in place the elements remaining in the tube against the thrust of the head from the fluid-pressure.

14. An apparatus for treating metallic tubes to shape and to strengthen the same, comprising means for closing one end of the tube, means for charging fluid-pressure into the closed end of the tube, a mandrel extending through the tube and temporarily secured to the closed end of the same, an annular head movable on the mandrel within the tube in advance of the fluid-pressure to confine the latter to a predetermined zone of application, a series of sleeves movable on the mandrel in advance of the head to be sequentially ejected from the tube, detachable means on the mandrel for holding the sleeves thereon against the thrust of the head from the fluid-pressure and operative to permit the release of the sleeves from the mandrel, the sequential ejectment of the sleeves from the tube and mandrel controlling the advance of the head, the length of the individual sleeves determining the area of increase in the consecutive applications of fluid-pressure.

15. An apparatus for treating metallic tubes to shape and to strengthen the same, comprising a plug screwed into one end of the tube to temporarily close the same, a mandrel extending through the tube and through the plug and having a duct for fluid-pressure charges leading into the inner end of the tube, an annular head movable on the mandrel within the tube in advance of the fluid-pressure to confine the latter to a predetermined zone of application, a series of sleeves movable on the mandrel in advance of the head to be sequentially ejected from the tube, the sequential ejectment of the sleeves from the tube and mandrel controlling the advance of the head, the length of the individual sleeves determining the area of increase in the consecutive applications of fluid-pressure, a nut on one end of the mandrel to engage the plug to hold the mandrel against the inward pull, and a nut on the other end of the mandrel to engage the outward thrust of the sleeves.

16. An apparatus for treating metallic tubes to shape and to strengthen the same, comprising relatively adjustable heads spaced apart in the tube being treated to confine therebetween the fluid-pressure to a predetermined zone of application, means for charging fluid-pressure into the tube between the heads, and adjustable means for holding the heads in their adjusted relation, said adjustable means being operative to permit progressive separations of the heads by the action of the fluid-pressure to include between said heads successive zones of increased area for the successive applications of fluid-pressure.

17. An apparatus for treating metallic tubes to shape and to strengthen the same, comprising heads spaced apart in the tube being treated to confine therebetween the fluid-pressure to a predetermined zone of application, one of said heads being stationary at one end of the tube and the other head being movably adjustable toward the other end of the tube, means for charging fluid-pressure into the tube between the heads, and adjustable means for holding the adjustable head in its adjustments, said adjustable means being operative to permit progressive movements of the adjustable head by the action of the fluid-pressure to include between said heads successive zones of increased area for the successive applications of fluid-pressure.

18. An apparatus for treating metallic tubes to shape and to strengthen the same, comprising heads spaced apart in the tube being treated to confine therebetween the fluid-pressure to a predetermined zone of application and with one of the heads movable relatively to the other, means for charging fluid-pressure into the tube between the heads, a mandrel and a series of sleeves removably mounted thereon coöperating to receive and transmit the thrust of the movable head to a fixed part of the tube, said sleeves being successively removable from the mandrel to permit progressive movements of the movable head by the action of the fluid-pressure thereon to include between said heads successive zones of increased area for the successive applications of the fluid-pressure, the increased area of each zone being determined by the previously removed sleeve.

19. An apparatus for treating metallic tubes to shape and to strengthen the same, comprising heads spaced apart in the tube being treated to confine therebetween the fluid-pressure to a predetermined zone of application, means for charging fluid-pressure into the tube between the heads, one of said heads being stationary at one end of the tube and the other head being movable toward the other end of the tube, a mandrel, and a series of sleeves removably mounted on the mandrel, said mandrel and sleeves coöperating to receive and transmit the thrust of the movable head to an abutment on the tube, said sleeves being successively removable from the mandrel to permit progressive movements of the movable head by the action of the fluid-pressure thereon to include between said heads successive zones of increased area for the successive applications of the fluid-pressure, the increased area of each zone being determined by the length of the previously removed sleeve.

20. The process of treating metallic tubes to shape and to strengthen the same by fluid-pressure introduced between heads relatively movable in the bore of the tube, consisting in subjecting the interior of the tube between the heads to deforming fluid-pressure and then introducing additional fluid-pressure to separate the heads to extend the area of application, applying deforming fluid-pressure to the area so extended, and repeating the operation throughout the length of the tube.

In testimony whereof I have signed this specification.

EUGÈNE SCHNEIDER.